Jan. 18, 1949.  S. S. OTIS  2,459,391
KNIFE RACK AND EDGER
Filed May 24, 1947  2 Sheets-Sheet 1

Inventor:
Samuel S. Otis,
By Brown, Jackson, Boettcher & Dienner.
Attys.

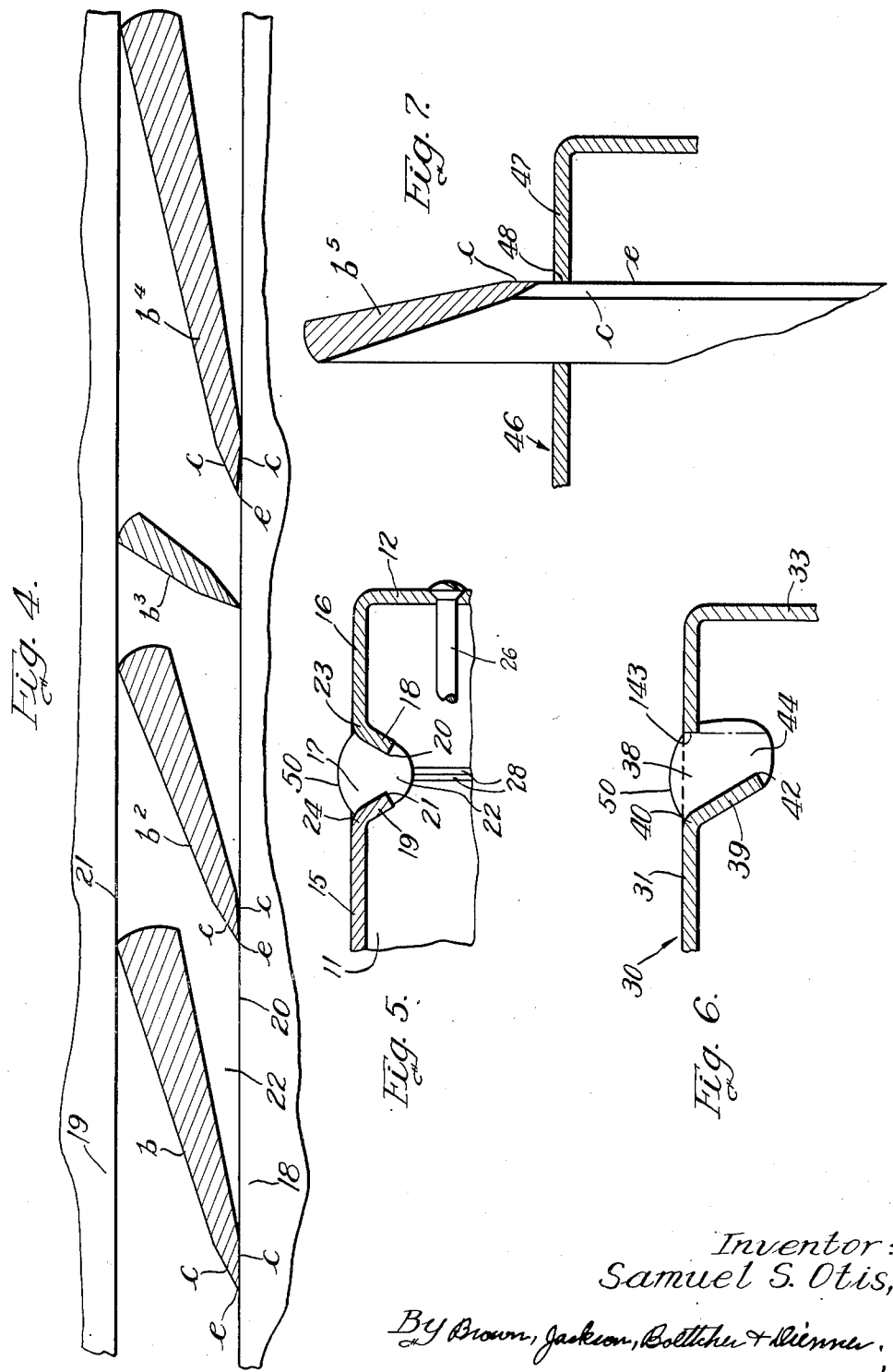

Patented Jan. 18, 1949

2,459,391

UNITED STATES PATENT OFFICE 2,459,391

KNIFE RACK AND EDGER

Samuel S. Otis, Winnetka, Ill.

Application May 24, 1947, Serial No. 750,344

6 Claims. (Cl. 76—82)

This invention relates to devices for holding knives and analogous articles of cutlery, and has to do with a knife rack and edger.

Cutting or meat blocks are extensively used in butcher shops, meat markets and like establishments. The meat cutters who use such blocks usually have available a number of knives, conveniently held, when not in use, in a rack attached to one side of the block. It is important, for obvious reasons, that the block and the rack, as well as the knives and other cutting tools used, be kept at all times in a clean and sanitary condition. It is also of importance, from the meat cutter's standpoint, that the knives retain their sharp cutting edges as long as possible, so as to reduce to a minimum the necessity for edging or steeling them.

Knife racks presently used by meat cutters are commonly formed of wood. In inserting the knife blades into the wood rack, and withdrawing them therefrom, particles of meat are scraped from the knife blades and accumulate upon the rack. Further, grease and blood scraped from the knife blades are readily absorbed by the wood of the rack. The net result is that the wood racks soon become soiled and in a highly unsanitary condition, which is objectionable for obvious reasons. Also, the knives inevitably become unsanitary, when held in the known wood racks referred to, and those racks are difficult to keep clean. Further, if the cutting edge of the knife blade contacts the rack, it cuts into the relatively soft wood with resultant dulling of the blade. The conscientious meat cutter is thus under the necessity of spending a substantial amount of time each day in thoroughly cleansing his knife rack, and in edging or steeling his knives and cleansing them.

My invention is directed to a knife rack of simple and inexpensive construction, which lends itself readily to cleansing with a minimum of time and effort and also functions as an edger for maintaining the cutting edges of the knife blades true and sharp. When replacing a used knife in the rack, the experienced meat cutter does not retain his grasp on the handle of the knife while inserting the blade thereof fully into the rack. To the contrary, he inserts the point of the blade in the slot in the rack, or may even merely align the blade with the slot, and then tosses the knife into the rack. When thus replacing the knife in the rack, the meat cutter may hold the knife with the cutting edge thereof either toward or away from him and, in the act of tossing the knife into the rack, turns his hand slightly either inward or outward so that the tendency is to move the cutting edge of the knife toward the corresponding side of the slot in the rack. On the other hand, when withdrawing a knife from the rack, the meat cutter grasps the handle of the knife and draws the latter toward him through the slot in the rack, the natural tendency at this time being to turn the hand so as to move the cutting edge of the blade toward the side of the slot in the rack opposite to that toward which it was moved in inserting the knife into the rack.

I have discovered that, by making the rack of a material sufficiently hard to exert an abrasive effect upon the knife blades, and providing it with a slot of appropriate width, such that the cutting edge portion of the blade of the knife will have edging or steeling contact with the edges of the slot of the rack, it is possible to edge the knife blade by the simple acts of insertion and withdrawal of the knife into and from the rack. In order to produce the desired edging effect and guard against injury to the cutting edge of the knife blade, however, there are certain limits which must be observed in respect to the width of the slot relative to the average width of the knife blade, that is, the extent of the knife blade from the cutting edge thereof to the opposite or back edge of the blade. In general, the width of the slot in the rack should be within from approximately one-eighth to one-third of the average width of the knife blade, as will be explained more fully later. The terms "edging" or "steeling" refer to that operation whereby the cutting edge of the knife is trued up and maintained in a true and sharp condition, as distinguished from sharpening by grinding of the cutting edge portion of the blade with accompanying removal of a substantial amount of metal. The meat cutter keeps at hand a steel which, under the present practice, he uses frequently for edging the knives, by drawing or rubbing them across the steel in a well known manner. That operation is analogous to a stropping operation, in which but little if any metal is removed, and is commonly termed edging of the knife blade, as distinguished from sharpening, in which metal in substantial amount is removed by grinding or otherwise. Further objects and advantages of my invention will appear from the detailed description.

In the drawings:

Figure 4 is a diagrammatic view, on an enlarged scale, of the slot of a knife rack and edger embodying my invention, showing a plurality of knife blades in section and the relation between such blades and the sides of the slot;

Figure 5 is a fragmentary sectional view, on an enlarged scale, taken substantially on line 5—5 of Figure 1;

Figure 6 is a fragmentary sectional view, on an enlarged scale, taken substantially on line 6—6 of Figure 2; and Figure 7 is a fragmentary vertical sectional view, on an enlarged scale, of a second modified form of rack and edger, showing, fragmentarily, a knife blade positioned in the slot thereof.

In sharpening the blade of an ordinary butcher or meat knife, the blade is ground at opposite sides thereof so as to present a beveled surface, these two beveled surfaces meeting or converging at the cutting edge of the blade. This sharpened portion of the blade is the cutting edge portion thereof, the blade as a whole being of generally wedge shape in cross section with the cutting edge portion thereof beveled from its opposite sides, as noted. After the blade has once been sharpened by grinding, it may be maintained in a sharp condition by edging the cutting edge portion thereof. The present practice, as above noted, is to edge the blade by drawing it across an edging steel or an analogous edging device. In edging the blade it may be held by the meat cutter at a somewhat different angle to the edging surface than the blade was held to the grinding or sharpening surface, in sharpening thereof. That will vary somewhat, within rather narrow limits, as will the angle at which the sides of the blade are beveled in the grinding or sharpening operation. The edging of the blade serves to keep the cutting edge thereof true, in the central plane of the blade extending from the cutting edge to the back edge thereof, and also may serve to remove a slight amount of metal so as to renew the sharp cutting edge of the blade. By frequent edging of the blade it may be maintained in a sharp condition most suitable for use of the knife, so that actual sharpening of the knife, by grinding, becomes necessary only at infrequent intervals. The rack and edger of my invention as directed to edging the blade of a knife by the insertion and withdrawal of the knife blade into and from the rack, thus reducing the necessity of the meat cutter frequently edging the blade on an edging steel or analogous device.

Figure 3:
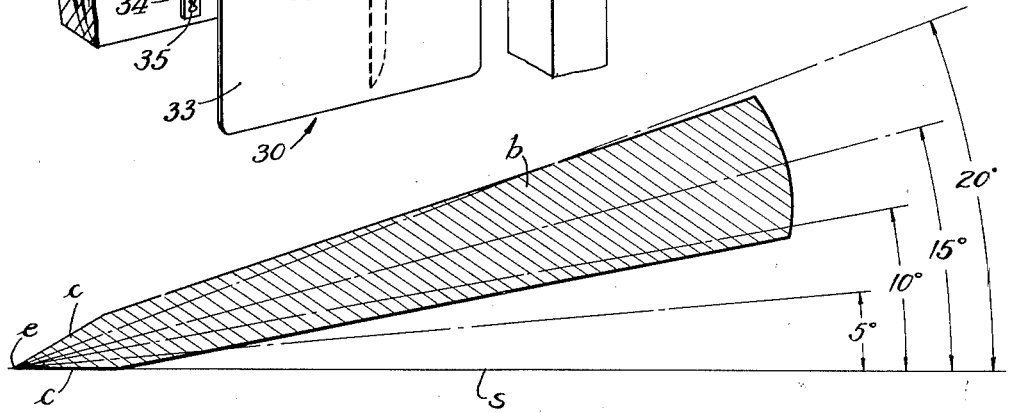
Figure 3 is a diagrammatic view showing a knife blade in section, on an enlarged scale, and indicating the various angles which this blade may assume relative to an edging surface.

In Figure 3 I have shown a knife blade $b$ in cross section, and have indicated the various angles that such a blade may assume relative to an edging surface $s$. In this figure the angles shown indicate, in each instance, the angle between the edging surface $s$ and the center plane of the blade $b$ taken from the cutting edge to the back edge thereof. The blade $b$ is provided, at its cutting edge portion, with the beveled surfaces $c$ at opposite sides thereof converging and meeting at the cutting edge $e$ of the blade. In order that an edging effect may be exerted on the blade by the surface $s$, the angle between that surface and the central plane of the blade should be such that the cutting edge portion of the latter, defined by the beveled surfaces $c$ and the cutting edge $e$ has contact with the surface $s$. This contact preferably should be for the full width of one of the beveled surfaces $c$, though it may be of less width, so long as it extends to the cutting edge $e$. Assuming the beveled surfaces $c$ of the blade $b$ to be as shown in Figure 3, the optimum angle between the edging surface $s$ and the central plane of blade $b$ is approximately fifteen degrees, as shown. If the angle between the respective beveled surfaces $c$ and the central plane of the blade is somewhat greater than that shown, the optimum angle of the blade to the edging surface $s$ may be twenty degrees, and if the angle of the respective beveled surfaces $c$ to the central plane of the blade $b$ is less than that shown, the optimum angle of the blade to the edging surface $s$ may be approximately ten degrees. With the beveled surfaces $c$ at the angle shown in Fig. 3, a blade may be edged by holding it at an angle greater than fifteen degrees to the edging surface $s$, for example twenty degrees, in which case the opposite sides of the edge portion of the blade will have imparted thereto quite narrow supplementary beveled surfaces merging at the cutting edge. That is true also of a blade in which the side beveled surfaces $c$ are at such an angle that the optimum angle of the blade $b$ to the edging surface $s$ would be approximately ten degrees. In no case, however, should the angle between the center plane of the blade and the edging surface be so great that the edging surface would be brought into direct contact with the cutting edge of the blade, nor should the angle be so small that the edging surface would contact the shoulders at the inner sides or edges of the beveled surfaces $c$. Direct contact between the cutting edge of the blade and the edging surface would be objectionable since it would tend to remove the cutting edge, thus dulling the knife instead of edging it, whereas contact between the edging surface and the shoulder at the inner edge of the beveled surface $c$ would be ineffective for edging the blade. Briefly, the angle between the edging surface and the center plane of the blade, taken from the cutting edge to the back thereof, should be such that the edging surface has edging contact with the cutting edge portion of the blade while avoiding direct contact between the cutting edge of the blade and the edging surface.

Figure 1:
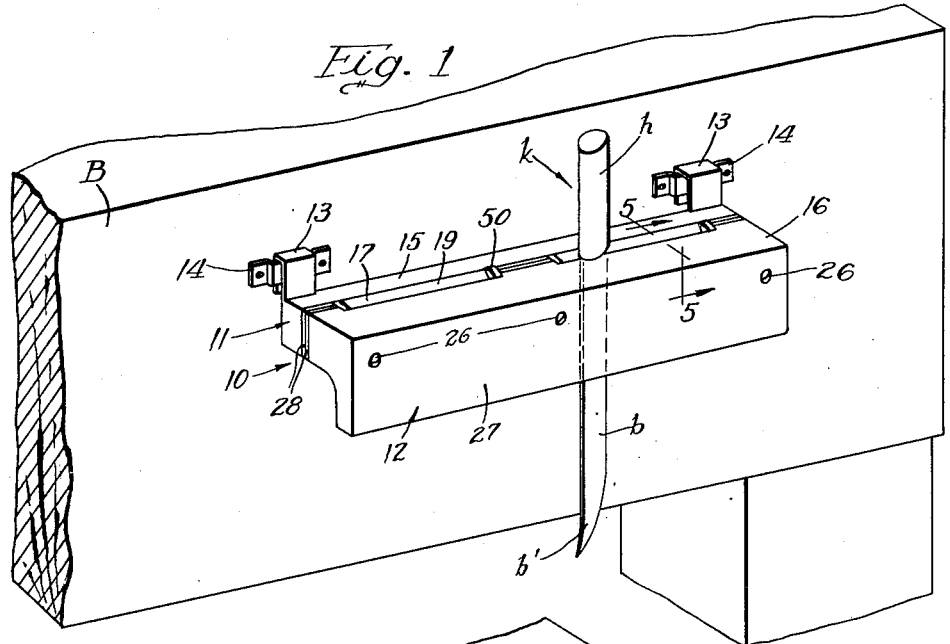
Figure 1 is a perspective side view of a knife rack and edger embodying my invention mounted on a cutting block, the latter being shown fragmentarily.

In Figure 1 I have shown a knife rack and edger 10 embodying my invention applied to one side of a cutting block B of known type. The rack and edger 10 comprises two sections 11 and 12 together constituting a housing structure. The section 11 is provided with upwardly extending arms 13 of inverted U shape which engage through suitable hangers or brackets 14 secured to the side of block B. That permits ready removal of the rack and edger 10 for cleansing thereof. It will be understood, however, that the rack and edger 10 may be mounted on the block in any suitable manner.

Section 11 is provided with a top wall 15 disposed in opposed relation to top wall 16 of section 12. This wall 16 is provided with two elongated openings 17 therein of rectangular shape in plan and has, at the outer side of each opening, a lip 18 conveniently formed integral with wall 16 and extending downward and inward therefrom. The top wall 15 of section 11 is also provided with a lip 19, conveniently formed integral therewith, and extending downward and outward therefrom. The two lips 18 and 19 are provided, at the upper portions of their lower edges, with edging elements 20 and 21, respectively, defining between them a slot 22. The lip 18 is connected to top wall 16 by a rounded element or fillet 23, and the lip 19 is connected to wall 15 by a rounded element or fillet 24. The lips 18 and 19 are thus adapted to be bent toward or away from each other so as to adjust the effective width of the slot 22 (Figure 5).

Conveniently, the sections 11 and 12 are releasably secured together by screws 26 passing through a depending wall or flange 27 of section 12, at the outer edge of top wall 16 thereof, and threading into section 11. Suitable spacing elements or shims 28 are disposed between the sections 11 and 12, the screws 26 passing through these shims. By varying the number of shims 28, or the thickness thereof, the sections 11 and 12 may be spaced apart various distances, to adjust the effective width of slot 22. In order to adjust the effective width of slot 22 by bending the lips 18 and 19, as above described, these lips are free at their ends from the associated sections 12 and 11, as will readily be understood, but they may be integrally secured to the respective housing sections at their ends, if desired, when shims 28 are used for adjusting the effective width of slot 22. Within the broader aspects of my invention, the sections 11 and 12 of rack and edger 10 may be adjusted toward and away from each other in any suitable manner.

While I have shown two slots with their corresponding openings 17 in Figure 1, it will be understood that the rack and edger 10 may be provided with any suitable number of slots. In Figure 1 I have shown a knife k provided with a suitable handle h, with the blade b thereof inserted through one of the openings 17 and the corresponding slot 22 of the rack and edger 10. The blade b is of reduced width or tapered at its end portion b1 remote from handle h. It will be noted that the edge of blade b is directed toward the right end of the slot, it being assumed that the meat cutter stands at the left hand side of block B and inserts the knife into the rack with the cutting edge of the blade away from him. In inserting the knife into the slot 22, the meat cutter may insert the tapered end b1 of the blade b into the opening 17 and then release handle h, in effect tossing the knife into the rack and edger. In fact, in some instances, the meat cuter may merely toss the knife into the rack and edger without preliminary insertion of the blade into the slot. As previously explained, when the knife is tossed into the rack and edger with its cutting edge away from the meat cutter, it is usually turned somewhat so as to bring the cutting edge portion of the blade into contact with the outer or right hand side of the slot 22, whereas in withdrawing the blade from the rack and edger the meat cutter turns it in the opposite direction, so as to bring the cutting edge portion of the blade into contact with the other side of the slot. I have discovered that by making the slot of proper width relative to the average width of the knife blade, by which I mean the width of the blade for the major portion of the length thereof, exclusive of the tapered end portion, it is possible to produce an edging effect, or to edge the cutting edge portion of the blade in the movement thereof lengthwise through the slot. In order to obtain that result, the effective width of the slot 22 should bear a certain relation to the average width of the knife blade, as will be understood more clearly from Figure 4 considered in connection with the diagram of Figure 3, previously discussed.

In Figure 4 I have shown diagrammatically a slot 22 which, for purposes of description, may be considered the same as the slot 22 defined by edging elements 20 and 21 of lips 18 and 19, respectively, of the rack and edger 10 shown in Figures 1 and 5. In Figure 4 it is assumed that the meat cutter is standing at the left hand end of the rack and edger, into which he has previously inserted the knives with the cutting edges of the blades toward him, and is now withdrawing the knives therefrom. Four knife blades b, b2, b3 and b4 are shown in the slot 22. The blade b may be considered the same as the blade b of Figure 3 and is provided with a cutting edge portion shaped similarly to that of the latter figure. The effective width of the slot 22 is approximately one-third of the width of the blade b as shown in Figure 4. In tossing the knife into the rack and edger, the meat cutter tends to turn the blade b across the slot 22 at an angle thereto so that the cutting edge portion of this blade contacts edging element 21, as previously explained. When the slot 22 is of an effective width equal to about one-third of the width of the blade, from the cutting edge to the back edge thereof, the central plane of blade b will be at an angle of approximately fifteen degrees to edging element 21, when blade b is disposed across the slot with its back edge in contact with edging element 20 and its cutting edge portion in contact with edging element 21. One of the beveled surfaces c of blade b is then in edging contact with edging element 21 so that as the knife blade moves downward by gravity through slot 22 it is edged by element 21. Conversely, when the meat cutter withdraws the knife from the rack and edger he more or less automatically turns it into its position shown in Figure 4, in which the other beveled surface c is in edging contact with edging element 20, when the back edge of the blade b is in contact with edging element 21. Accordingly, when the knife is withdrawn from the rack and edger, the cutting edge portion of the knife blade is edged at the other side thereof, i. e., at the side opposite to that at which it is edged when the knife is inserted into the rack and edger. In that manner, the blade of the knife is edged in the insertion and removal of the knife into and from the rack and edger without requiring any attention on the part of the meat cutter, and necessity for frequent edging of the knife on a steel or analogous instrument is eliminated. The blade b2 of Figure 4 is of less width than the blade b— approximately two and one-half times the width of slot 22. Accordingly this blade b2 has edging contact with the edging elements 20 and 21 for a portion only of the beveled surfaces c and acquires, by edging contact with such elements, supplementary beveled surfaces of substantially less width than the surfaces c and merging into the cutting edge e. This blade b2, however, will be edged by insertion and withdrawal thereof lengthwise into and from slot 22, so as to maintain the edge e in a true and sharp condition without necessity for frequent edging on a steel or analogous instrument. The width of the blade b3 is but slightly greater than the width of slot 22. Accordingly, if a knife having a blade of that width were tossed into the rack and edger 10, there would be risk that the cutting edge of blade b3 would come into direct contact with the edging element 21, which would result in dulling of the knife. Likewise, when the blade b3 was withdrawn through slot 22 there would be risk of dulling the cutting edge of the blade. Accordingly, a narrower slot should be provided for a knife blade of the width of the blade $b3$. The blade $b4$ shown in Figure 4 has a width substantially greater than three times the width of slot 22, approaching four times the width of that slot. When this blade $b4$ is withdrawn through slot 22 with its back edge in contact with edging element 21, the shoulder at the inner edge or side of the lower beveled surface $c$ is in contact with the edging element 20 so that the lower beveled surface $c$ does not contact element 20 which, therefore, does not have edging contact with the cutting edge portion of blade $b4$. The same is true when the blade $b4$ is turned into its opposite position, with its back edge in contact with the edging element 20. Accordingly, the slot 22 should be wider than shown in Figure 4 when used with a knife blade having the width of blade $b4$, with its cutting edge portion beveled as shown, in order to exert an edging effect on the cutting edge portion thereof. As previously noted, in sharpening knife blades the bevel of the cutting edge portions thereof may vary considerably, depending upon the thickness of the blade, the preference of the meat cutter or of the sharpener, and other factors. Also, the bevel used on hollow ground blades may differ from that of blades which are not hollow ground. I have found, after extensive investigation, that the effective width of the slot 22 may vary from approximately one-eighth to one-third of the width of a given knife blade, depending upon the type of blade and the bevel applied to the cutting edge portion thereof in grinding or sharpening of the blade. On the average, the slot 22 should have an effective width of approximately one-third the average width of the knife blade, though that may be varied within the limits stated. It will be understood, of course, that the knife rack and edger 10 may be provided with a plurality of slots, each intended for reception of knife blades of predetermined average width within limits such that they will be edged when moved lengthwise in either direction through the slot in the manner previously described.

Figure 2:
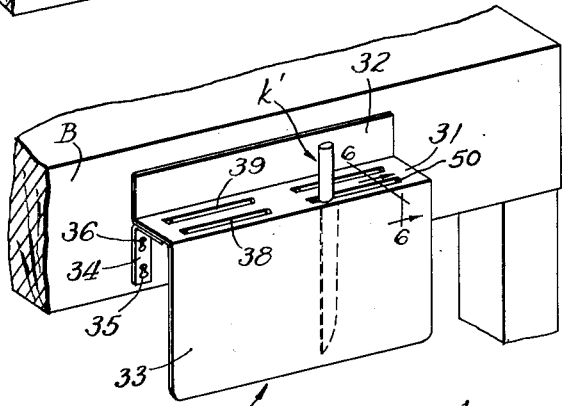
Figure 2 is a view similar to Figure 1, on a reduced scale, showing a modified form of knife rack and edger.

In Figure 2 I have shown a knife rack and edger 30 of approximately Z shape in cross section, providing a substantially horizontal shelf member 31 corresponding to the shelf member provided by the wall members 15 and 16 of the rack and edger 10 of Figure 1, an inner flange 32 extending upward from shelf member 31 and an outer flange or apron 33 extending downward from the outer edge of shelf member 31. A mounting bracket 34 is secured to shelf member 31, at each end thereof, this bracket being provided with keyhole slots 35 receiving headed screws 36 secured in the side of the cutting block B and, in cooperation with brackets 34, removably mounting the rack and edger 30 thereon. The shelf member 31 is provided with a plurality of elongated openings 38 of rectangular shape in plan, which openings are adapted for reception of the blades of knives, such as the knife $k1$. A lip 39 extends downward from shelf member 31, at one side of opening 38 and toward the opposite side thereof, this lip being connected to shelf 31 by a rounded element or fillet 40 and being free at its ends from shelf member 31. Lip 39 is provided, at the upper portion of its lower edge, with an edging element or edge 42. The other or outer side of opening 38 is defined by a flat edge or surface 43 defining, with edging element 42, a slot 44 of predetermined width. The lip 39 may be bent toward or away from the edging element 43 so as to adjust the effective width of slot 44. It will be understood that each of the slots in the shelf 31 is adapted for reception of knife blades of width within a predetermined range such that they will be edged by the edging elements 42 and 43 when moved lengthwise in either direction through the slot 44, in the manner previously described.

In Figure 7 I have shown a modified form of rack and edger 46, which is substantially the same as that shown in Figures 2 and 6, except that shelf member 47 is provided with a slot 48 the side edges of which are both in the plane of shelf member 47 and constitute edging elements. Slot 48 is intended for reception of a knife blade $b5$ of proper width to be edged when moved lengthwise through slot 48 in either direction. In Figure 7, the blade $b5$ is shown fragmentarily and substantially in the position which it assumes when the knife is tossed into the rack and edger 46 with the cutting edge thereof away from the meat cutter, the cutting edge portion of blade $b5$ being then in edging contact with the outer or right hand edging element of plate 47. When the blade $b5$ is withdrawn through slot 48, it is turned into its opposite position, in which the cutting edge portion of the blade is in edging contact with the inner side or edging element of slot 48.

Since the experienced meat cutter or butcher usually stands at one side of the cutting block 11 and tosses the knives into the rack and edger with the cutting edge of the knife blade directed either toward or away from him, I provide a suitable bumper 50, which may be formed of a natural or synthetic rubber, or of any suitable material, located at each end of the blade receiving slot. The rack and edger of my invention may be formed of any suitable material, sufficiently hard to exert an abrasive and truing effect upon the cutting edge portions of the knife blades, preferably of a non-absorbent material such as metal. I have found stainless steel to be particularly suitable. The rack and edger 10 of Figure 1 may be cast, if desired, or it may be fabricated from parts welded or otherwise suitably secured together. The other forms of rack and edger herein disclosed lend themselves readily to production by simple stamping operations from stainless steel of suitable gauge. It will be apparent that all of the several forms of rack and edger disclosed herein may readily be formed of metal, are non-absorbent in character and may readily be cleansed by suitable antiseptic solutions, by germicidal lamps, or by boiling water, whereby they may be maintained in a clean and sanitary condition with a minimum of expenditure of time and effort. Also, by having the knife blade receiving slots of a width bearing a definite relation to the width of the knife blade, as above explained, the knives are edged by simply inserting them into and removing them from the rack and edger, thereby eliminating necessity for frequent edging of the knives on a steel or the like.

As above indicated, and as will be understood, changes in details of construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In a knife rack and edger, a metal wall member provided with a slot intended for reception of a knife blade, said wall member having an edging element at one side of said slot, and a lip at the other side of said slot extending from said wall member at an angle thereto bendable toward and away from said edging element, said lip having at its free edge an edging element defining with said first edging element the sides of said slot, the effective width of said slot being adjustable by bending said lip toward and from said first edging element, said edging elements being disposed for edging contact of one thereof with the cutting edge portion of the knife blade when the latter is moved lengthwise through said slot with its back edge in contact with the other of said edging elements.

2. In a knife rack and edger, a metal wall member provided with a slot for reception of a knife blade, said wall member having an edging element at one side of said slot, and a lip at the other side of said slot extending from said wall member at an angle thereto and attached to said wall member by a bendable connection whereby the free edge of said lip may be adjusted toward and away from said edging element, said lip having at its free edge an edging element defining with said first edging element the sides of said slot, the effective width of said slot being adjustable by bending said lip toward and from said first edging element, said edging elements being disposed for edging contact of one thereof with the cutting edge portion of the knife blade when the latter is moved lengthwise through said slot with its back edge in contact with the other of said edging elements.

3. In a knife rack and edger, a substantially horizontal metal shelf member provided with a slot for reception of a knife blade moved vertically therethrough, said shelf member having an edging element at one side of said slot, and a lip at the other side of said slot extending from said shelf member downward at an inclination toward said edging element, said lip having at its lower edge an edging element defining with said first edging element the sides of said slot and being bendable toward and away from said first edging element for adjusting the effective width of said slot, said edging elements being disposed for edging contact of one thereof with the cutting edge portion of the knife blade when the latter is moved lengthwise through said slot with its back edge in contact with the other of said edging elements.

4. In a knife rack and edger, a substantially horizontal metal shelf member provided with an opening substantially rectangular in plan, and downwardly converging lips extending from the opposite sides of said opening each having at its lower edge an edging element, said edging element defining the sides of a slot adapted for reception of a knife blade moved vertically therethrough so that the cutting edge portion of said blade is brought into edging contact with one of said edging elements when said blade is moved lengthwise through said slot with the back edge of the blade in contact with the other edging element.

5. As a new article of manufacture, a knife rack and edger including a unitary sheet metal structure of substantially Z shape in cross section comprising a substantially horizontal shelf member rectangular in plan with an upwardly extending flange at one side edge and a downwardly extending flange at its opposite side edge, said shelf member having therein a slot providing edging elements at opposite sides of said slot integral with said shelf member for edging contact with the cutting edge portion of a knife blade moved vertically through said slot with the back of the blade in contact with one of said elements and the cutting edge portion of the blade in contact with the other of said elements.

6. As a new article of manufacture, a knife rack and edger comprising a substantially horizontal shelf member formed of a substantially rigid non-porous non-absorbent material, said shelf member having a slot therein for reception of the blades of knives and providing edging elements at opposite sides of said slot integral with said shelf member and disposed for edging contact with the cutting edge portion of a knife blade moved vertically through said slot with the back of the blade in contact with one of said elements and the cutting edge portion of the blade in contact with the other of said elements.

SAMUEL S. OTIS.

REFERENCES CITED

The following references are of record in the file of this patent:

UNITED STATES PATENTS

| Number | Name | Date |
| --- | --- | --- |
| 1,619,833 | Stegner | Mar. 8, 1927 |
| 1,861,683 | Branch | June 7, 1932 |

FOREIGN PATENTS

| Number | Country | Date |
| --- | --- | --- |
| 166,285 | Switzerland | Dec. 31, 1933 |